United States Patent
Xu et al.

(10) Patent No.: US 11,657,019 B2
(45) Date of Patent: May 23, 2023

(54) METHOD, DEVICE, AND COMPUTER PROGRAM PRODUCT FOR MANAGING APPLICATION SYSTEM

(71) Applicant: EMC IP Holding Company LLC, Hopkinton, MA (US)

(72) Inventors: Hongru Xu, Shanghai (CN); Tianfang Xiong, Shanghai (CN); Qiu Shang, Shanghai (CN); Fei Long, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 226 days.

(21) Appl. No.: 16/835,755

(22) Filed: Mar. 31, 2020

(65) Prior Publication Data
US 2021/0034569 A1    Feb. 4, 2021

(30) Foreign Application Priority Data
Jul. 30, 2019 (CN) .......................... 201910697356.8

(51) Int. Cl.
*G06F 16/11* (2019.01)
*G06F 16/178* (2019.01)
(Continued)

(52) U.S. Cl.
CPC .......... *G06F 16/128* (2019.01); *G06F 16/178* (2019.01); *G06F 16/182* (2019.01); *G06F 16/252* (2019.01); *G06F 16/275* (2019.01)

(58) Field of Classification Search
CPC .... G06F 16/128; G06F 3/065; G06F 11/1402; G06F 11/2056; G06F 16/178;
(Continued)

(56) References Cited

U.S. PATENT DOCUMENTS 7,437,601 B1 * 10/2008 Manley ............... G06F 11/1451
711/162
8,806,274 B1 * 8/2014 Chatterjee ........... G06F 16/2308
714/20
(Continued)

OTHER PUBLICATIONS

OraRep11g2: "Oracle® Database Advanced Replication", (11g Release 2 (11.2), Jun. 2013, Primary Author: Randy Urbano, hereafter "OraRep11g2" (Year: 2013).*
(Continued)

*Primary Examiner* — Kuen S Lu
(74) *Attorney, Agent, or Firm* — BainwoodHuang

(57) ABSTRACT

Techniques manage application systems in an application environment. The application environment includes a first application system, a second application system and a third application system. First snapshot information of a first group of snapshots of the first application system is obtained, the first application system being in active state. Second snapshot information of a second group of snapshots of the second application system is obtained, the second application system being in standby state. It is determined whether the second application system and the third application system have a common snapshot based on the first snapshot information and the second snapshot information. Data is synchronized to the third application system depending on whether the second application system and the third application system have a common snapshot. Overheads required during data synchronization may be reduced as far as possible, and the efficiency of data synchronization may be improved.

23 Claims, 9 Drawing Sheets

(51) Int. Cl.
*G06F 16/182* (2019.01)
*G06F 16/25* (2019.01)
*G06F 16/27* (2019.01)

(58) Field of Classification Search
CPC .... G06F 16/182; G06F 16/252; G06F 16/275; G06F 11/2041; G06F 11/2048; G06F 11/203; G06F 16/2365; G06F 16/22; G06F 16/27; G06F 11/2097; G06F 11/2094; G06F 11/2089; G06F 11/2082; G06F 11/2079; G06F 11/2076; G06F 11/2074; G06F 11/2069; G06F 11/2066; G06F 11/2064; G06F 11/2058; G06F 11/2053; G06F 11/2023; G06F 11/1658; H04L 29/0854

See application file for complete search history.

(56) References Cited

U.S. PATENT DOCUMENTS

| | | | |
|---|---|---|---|
| 9,881,014 | B1 | 1/2018 | Bono et al. |
| 10,289,690 | B1 | 5/2019 | Bono et al. |
| 10,733,161 | B1 | 8/2020 | Davenport et al. |
| 2004/0153736 | A1* | 8/2004 | Viswanathan ...... G06F 11/2082 714/6.22 |
| 2005/0251633 | A1* | 11/2005 | Micka ................. G06F 11/2076 711/162 |
| 2008/0046552 | A1* | 2/2008 | Watson ............... H04L 43/0817 709/223 |
| 2012/0136832 | A1* | 5/2012 | Sadhwani ........... G06F 11/1469 707/640 |
| 2014/0173095 | A1* | 6/2014 | Steuer .................... H04L 67/16 709/224 |
| 2016/0292250 | A1* | 10/2016 | Chen ..................... G06F 16/273 |
| 2016/0378625 | A1* | 12/2016 | Aizer ...................... G06F 3/065 714/6.3 |
| 2017/0185497 | A1* | 6/2017 | Luo ...................... G06F 11/2058 |
| 2017/0315874 | A1* | 11/2017 | Patnaik ............... G06F 11/2094 |
| 2018/0081766 | A1* | 3/2018 | Ghuge ................ G06F 11/2048 |
| 2018/0307568 | A1* | 10/2018 | Braddy ............... G06F 11/1662 |
| 2019/0018738 | A1* | 1/2019 | Chen ................... G06F 11/1451 |
| 2020/0073771 | A1* | 3/2020 | Ward ..................... G06F 3/0689 |

OTHER PUBLICATIONS

OraGrd11g2: "Oracle® Data Guard Concepts and Administration", (11g Release 2 (11.2), Feb. 2014, Primary Author: Kathy Rich, hereafter "OraRep11g2"). (Year: 2014).*

* cited by examiner

METHOD, DEVICE, AND COMPUTER PROGRAM PRODUCT FOR MANAGING APPLICATION SYSTEM

CROSS-REFERENCE TO RELATED APPLICATION

This application claims priority to Chinese Patent Application No. CN201910697356.8, on file at the China National Intellectual Property Administration (CNIPA), having a filing date of Jul. 30, 2019, and having "METHOD, DEVICE, AND COMPUTER PROGRAM PRODUCT FOR MANAGING APPLICATION SYSTEM" as a title, the contents and teachings of which are herein incorporated by reference in their entirety.

FIELD

Various implementations of the present disclosure relate to application systems, and more specifically, to a method, device and computer program product for managing application systems.

BACKGROUND

With the development of computer technology, various application systems now provide users with increasingly large data storage capacities, and their data access speed is also greatly accelerated. As the data storage capacity increases, users put forward higher demands on the data reliability. Technical solutions for serving users based on multiple application systems have been developed, in which one application system may be in active state, while another application system may be in standby state so as to replace the application system in active state when it fails or has a higher workload. This process may be referred to as failover.

In order to guarantee the availability and reliability of an application system, data synchronization is required among multiple application systems. In this regard, how to perform data synchronization with higher efficiency becomes a focus of research.

SUMMARY

Therefore, it is desirable to develop and implement a technical solution for managing application systems more effectively. It is desired that the technical solution can be compatible with an existing application system and manage application systems more effectively by reconstructing configurations of the existing application system.

According to a first aspect of the present disclosure, there is provided a method for managing application systems in an application environment. Here the application environment includes a first application system, a second application system and a third application system. In the method, first snapshot information of a first group of snapshots of the first application system is obtained, the first application system being in active state. Second snapshot information of a second group of snapshots of the second application system is obtained, the second application system being in standby state. It is determined whether the second application system and the third application system have a common snapshot based on the first snapshot information and the second snapshot information. Data is synchronized to the third application system depending on whether the second application system and the third application system have a common snapshot.

According to a second aspect of the present disclosure, there is provided a device for managing application systems in an application environment, the application environment including a first application system, a second application system and a third application system. The device includes: at least one processor; a volatile memory; and a memory coupled to the at least one processor, the memory having instructions stored thereon, the instructions, when executed by the at least one processor, causing the device to perform acts. The acts include: obtaining first snapshot information of a first group of snapshots of the first application system, the first application system being in active state; obtaining second snapshot information of a second group of snapshots of the second application system, the second application system being in standby state; based on the first snapshot information and the second snapshot information, determining whether the second application system and the third application system have a common snapshot; and synchronizing data to the third application system depending on whether the second application system and the third application system have a common snapshot.

According to a third aspect of the present disclosure, there is provided a computer program product. The computer program product is tangibly stored on a non-transient computer readable medium and includes machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

Figure 1:
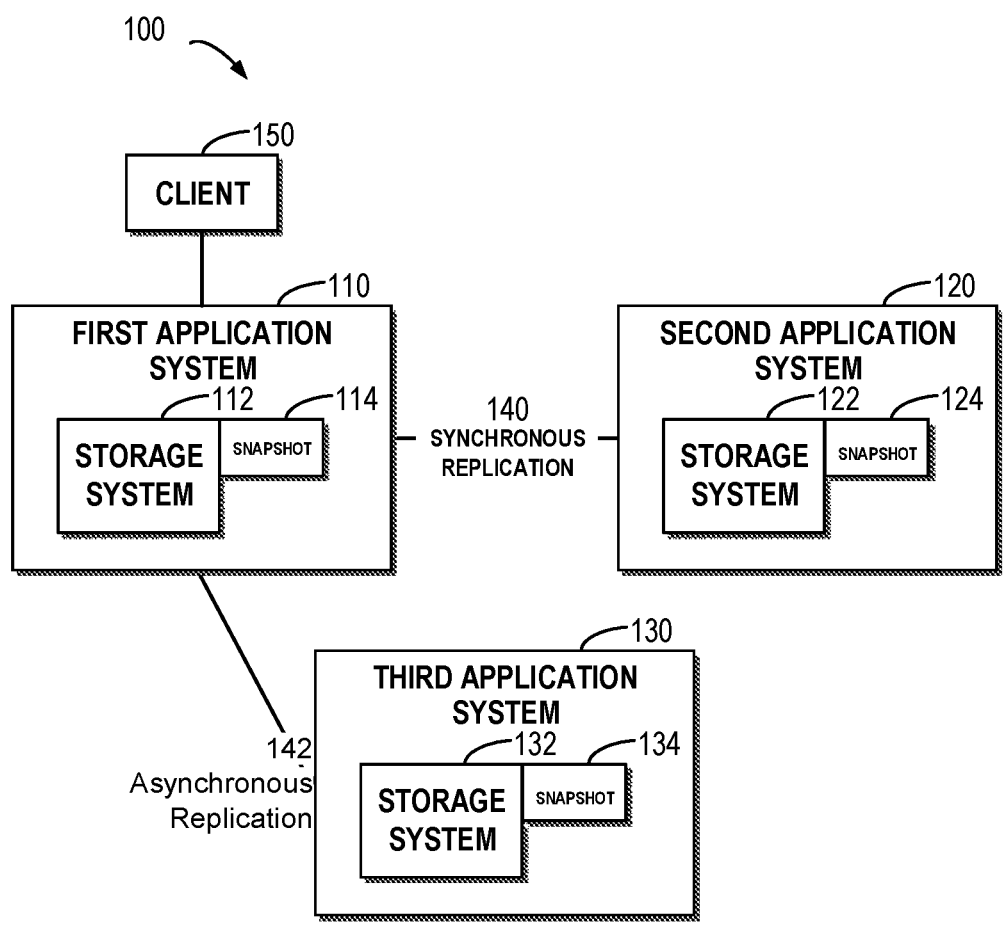
FIG. 1 shows a schematic view of an application environment in which example implementations of the present disclosure may be implemented.

FIG. 1 shows a schematic view of an application environment 100 in which example implementations of the present disclosure may be implemented. As shown, the application environment 100 may include a first application system 110, a second application system 120 and a third application system. Here the first application system 110 is in active state, for serving an access request from a client 150. There is a synchronous replication 140 connection between the first application system 110 and the second application system 120, via which connection a storage system 122 in the second application system 120 keeps in-sync with a storage system 112 in the first application system 110. The second application system 120 is in standby state, for taking over the work of the first application system 110 when the first application system 110 fails or is overloaded. There is an asynchronous replication 142 connection between the third application system 130 and the first application system 110. The third application system 130 will operate as a backup system.

While the first application system 110 is running, the client 150 may access data in the storage system 112. In order to realize asynchronous replication between the first application system 110 and the third application system 130, snapshots may be generated periodically or as demanded, and may be transferred to the third application system 130. For example, in the first application system 110, a snapshot 114 may be generated at a time point T0. The first application system 110 may transmit the snapshot 114 to the third application system 130 via the asynchronous replication 142 connection, so that the third application system 130 will contain a snapshot 134. Subsequently, a storage system 132 may be recovered using the snapshot 134. Where the third application system 130 already contains the snapshot 134, the first application system 110 may further send the snapshot 114 to the second application system 120, so that the second application system 120 will contain a snapshot 124. At this point, the snapshot 114 in the first application system 110, the snapshot 124 in the second application system 120 and the snapshot 134 in the third application system 130 have the same content.

Figure 2:
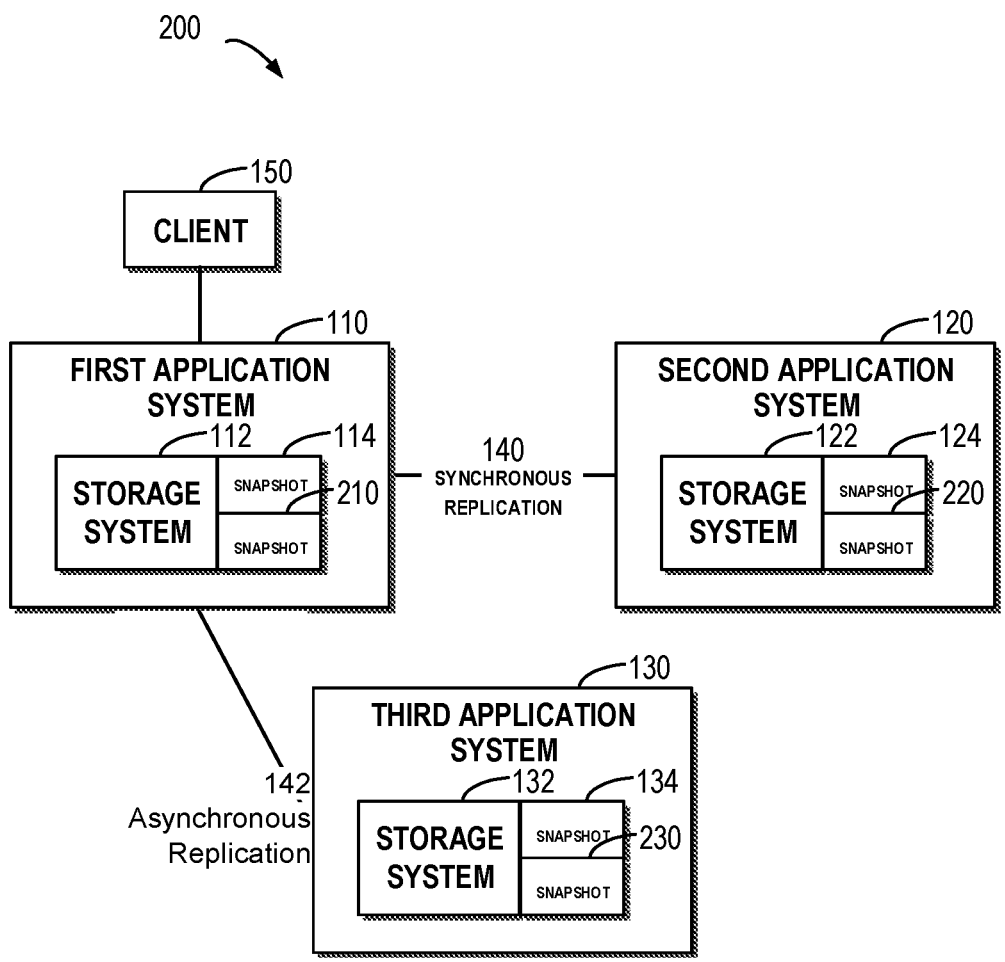
FIG. 2 schematically shows a block diagram of states of multiple application systems.

At different time points of the running of various application systems in the application environment, other snapshots may further be generated, which will be described with reference to FIG. 2 below. FIG. 2 schematically shows a block diagram 200 of the state of multiple application systems. In the first application system 110, a snapshot 210 may be generated at a time point T1, and the first application system 110 may transmit the snapshot 210 to the third application system 130 via an asynchronous replication 142 connection, so that the third application system 130 will contain a snapshot 230. Subsequently at the third application system 130, the storage system may be recovered using the snapshot 230, so as to generate an updated storage system. Where the third application system 130 already contains the snapshot 230, the first application system 110 may further send the snapshot 210 to the second application system 120, so that the second application system 120 will contain a snapshot 220. At this point, the snapshots 114, 124 and 134 have the same content, and the snapshots 210, 220 and 230 have the same content.

At a subsequent time point after various application systems in the application environment are already started and run normally, a new snapshot may further be generated to replace an older-version snapshot of the two snapshots at the first application system 110. In normal running, each application system will include two snapshots. However, since a connection between application systems might fail, this will lead to inconsistencies in numbers and versions of snapshots between various application systems.

At this point, if a failover from the first application system 110 to the second application system 120 needs to be performed, it should be determined whether a storage system 122 in the second application system 120 is consistent with a storage system 132 in the third application system 130 or not. If not, then a synchronization operation between the second application system 120 and the third application system 130 is needed, e.g. a full copy between the second application system 120 and the third application system 130 may be performed. It will be understood the full copy will lead to great time and bandwidth overheads and further postpone the failover progress. At this point, it is desirable to reduce the data amount to be copied, so as to reduce the transmission amount and further improve the failover performance.

To solve the above drawbacks, implementations of the present disclosure provide a method, device and computer program product for managing application systems in the application environment 100. According to example implementations of the present disclosure, there is proposed the concept of common snapshots, i.e. snapshots having the same content may be called common snapshots. In other words, if snapshots of two application systems include have the same content, then it is considered the two application systems have common snapshots. If snapshots of two application systems include have different content, then it is considered the two application systems have no common snapshots. More details about example implementations of the present disclosure will be described with reference to FIG. 3 below.

Figure 3:
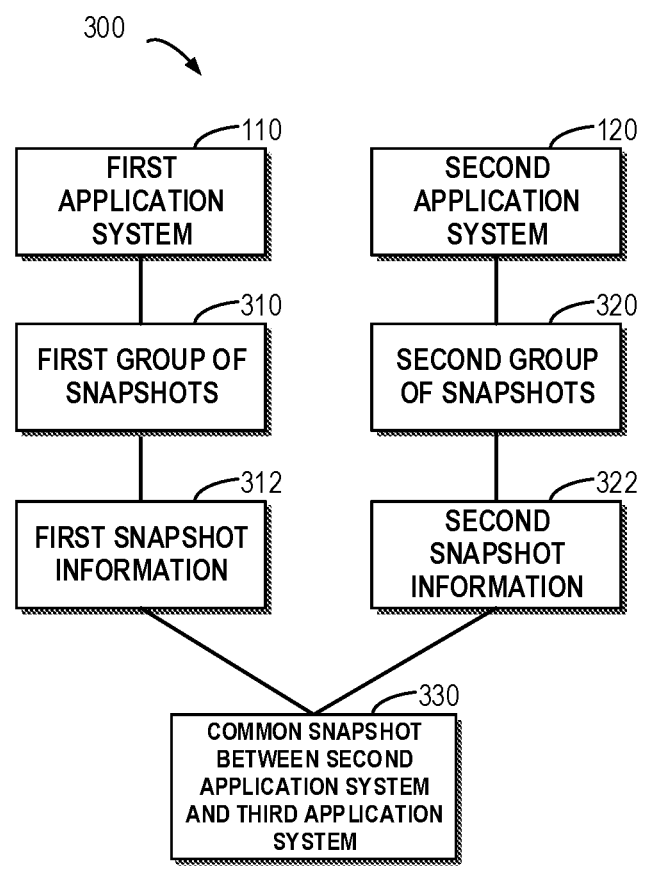
FIG. 3 schematically shows a block diagram for managing application systems in an application environment according to example implementations of the present disclosure.

FIG. 3 schematically shows a block diagram 300 for managing application systems in the application environment 100. As shown, a first group of snapshots 310 in the first application system 110 may be determined. The number of snapshots in the first group of snapshots 310 may be 0, 1 or 2. First snapshot information 312 about the first group of snapshots 310 may be determined, which snapshot information 312 may include, for example, the number and version information of snapshots in the first group of snapshots 310. Similarly, a second group of snapshots 320 in the second application system 120 may be determined, and second snapshot information 322 about the second group of snapshots 320 may be determined. By comparing the first snapshot information 312 with the second snapshot information 322, it may be determined whether the second application system 120 and the third application system 130 have a common snapshot 330.

It will be understood due to the synchronous replication connection between the first application system 110 and the second application system 120, there exists various information concerning the second application system 120 at the first application system 110. With example implementations of the present disclosure, whether the second application system 120 and the third application system 130 have a common snapshot may be determined without accessing the third application system 130. If there is a common snapshot, then a full copy between the second application system 120 and the third application system 130 is not needed. In this way, before performing a full copy, first it may be judged whether a full copy is needed, and the full copy is performed only when the two application systems have no common snapshot. Thus, the efficiency of data synchronization may be increased significantly, and the complexity of preparations before a failover may be reduced.

Further, with example implementations of the present disclosure, data may be synchronized to the third application system 130 depending on whether the second application system 120 and the third application system 130 have a common snapshot. If there is a common snapshot, then only data other than the common snapshot is transmitted. In this way, overheads for a full copy between two application systems may be avoided.

Figure 4:
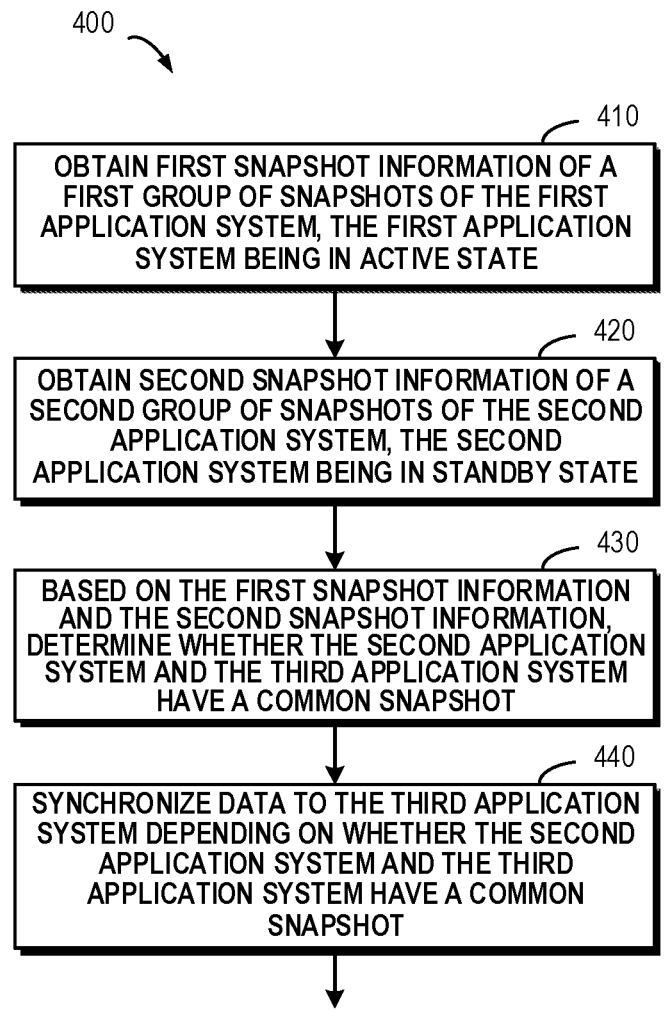
FIG. 4 schematically shows a flowchart of a method for managing application systems in an application environment according to example implementations of the present disclosure.

More details on how to manage application systems will be described with reference to FIG. 4. This figure schematically shows a flowchart of a method 400 for managing application systems in an application environment according to example implementations of the present disclosure. There is provided a method for managing application systems in the application environment 100. Here, the application environment 100 includes the first application system 110, the second application system 120 and the third application system 130. The first application system 110 may be in active state, the second application system 120 may be in standby state, and the third application system 130 may be in backup state.

At block 410, the first snapshot information of the first group of snapshots 310 in the first application system 110 may be obtained. According to example implementations of the present disclosure, the method 400 may be performed at the first application system 110, so the first snapshot information 312 may be obtained conveniently. When the first application system 110 is in different situations, the first group of snapshots 310 may include 0, 1 or 2 snapshots.

At block 420, the second snapshot information 322 of the second group of snapshots 320 in the second application system 120 may be obtained. It will be understood due to the synchronous replication connection 140 between the first application system 110 and the second application system 120, the first application system 110 may obtain the second snapshot information 322 of the second group of snapshots 320 in the second application system 120 without extra communication. When the second application system 120 is in different situations, the second group of snapshots 320 may include 0, 1 or 2 snapshots.

At block 430, whether the second application system 120 and the third application system 130 have a common snapshot may be determined based on the first snapshot information 312 and the second snapshot information 322. Here, whether there is a common snapshot may be determined based on the numbers of snapshots in various application systems as contained in the snapshot information.

According to example implementations of the present disclosure, first of all, the number of common snapshots between the first group of snapshots 310 and the second group of snapshots 320 may be determined based on the first snapshot information 312 and the second snapshot information 322.

According to example implementations of the present disclosure, if the first snapshot information 312 and the second snapshot information 322 do not contain an identical version (i.e. the number of common snapshots between the first application system 110 and the second application system 120 is 0), then it may be determined the second application system 120 and the third application system 130 have no common snapshot, without checking version information of snapshots in the third application system 130.

It will be understood due to the synchronous replication 140 connection between the first application system 110 and the second application system 120, the first application system 110 may know the second snapshot information 322 of the second group of snapshots 320 in the second application system 120, based on the existing communication mechanism in the application environment. In this way, without extra communication, it may be judged the second application system 120 and the third application system 130 have no common snapshot. Further, subsequent data synchronization may be performed based on the full copy.

According to example implementations of the present disclosure, the snapshot information may be represented in different data structures. For example, the first snapshot information 312 and the second snapshot information 322 may be represented in Table 1 and Table 2 respectively.

TABLE 1

First Snapshot Information

| Serial No. | Version Number of Snapshot |
|---|---|
| 1 | V0005 |
| 2 | V0006 |

TABLE 2

Second Snapshot Information

| Serial No. | Version Number of Snapshot |
|---|---|
| 1 | V0005 |
| 2 | V0006 |

As is clear by comparing the snapshot information shown in Table 1 and Table 2, each of the first group of snapshots 310 and the second group of snapshots 320 includes snapshots in versions V0005 and V0006. At this point, the number of common snapshots between the first group of snapshots 310 and the second group of snapshots 320 is 2, so it is determined the second application system 120 and the third application system 130 have at least one common snapshot.

It will be understood after a snapshot in the first application system 110 is synchronized to the third application system 130, the snapshot will be synchronized to the second application system 120. Therefore, all the three application systems are in normal state, at which point both the synchronous replication 140 connection and the asynchronous replication 142 connection are in normal state. The third application system 130 will have two snapshots, and content of the two snapshots are the same as content of two snapshots in the second application system 120. With example implementations of the present disclosure, common snapshots between the first application system 110 and the second application system 120 may be determined without checking snapshot versions in the third application system 130. In this way, without extra communication, it may be judged the second application system 120 and the third application system 130 have common snapshots. Further, subsequent data synchronization may be performed based on incremental transmission.

According to example implementations of the present disclosure, if it is determined the number of common snapshots between the first application system 110 and the second application system 120 is 1, it cannot be judged whether the second application system 120 and the third application system 130 have a common snapshot. Instead, third snapshot information of a third group of snapshots in the third application system 130 needs to be obtained, and based on the second snapshot information 322 and the third snapshot information, it may be determined whether the second application system 120 and the third application system 130 have a common snapshot or not.

Whether the second application system 120 and the third application system 130 have a common snapshot may be determined by comparing versions of snapshots in the second snapshot information 322 and the third snapshot information. If the second snapshot information 322 and the third snapshot information include a snapshot in the same version number, then it is determined the two systems have a common snapshot. The above circumstance might arise in the starting stage of the application system, which will be described with reference to FIG. 1. A snapshot 114 of the first application system 110 is generated at a time point T0. The snapshot 114 is already transmitted to the third application system 130, and thus the snapshot 134 is formed, and the snapshot 114 is already transmitted to the second application system 120, and thus the snapshot 124 is formed. At this point, the snapshot 124 in the second application system 120 and the snapshot in the third application system 130 have the same version, so the snapshot 124 in the second application system 120 and the snapshot 134 in the third application system 130 are a common snapshot.

According to example implementations of the present disclosure, a further circumstance might arise in which the second application system 120 and the third application system 130 have no common snapshot. At this point, snapshot information of a group of snapshots in the third application system 130 may be queried via an asynchronous replication 142 connection. Further, versions of snapshots in the second application system 120 and the third application system 130 may be compared to see whether they are the same.

According to example implementations of the present disclosure, if it is determined at least one part of the second snapshot information matches at least one part of the third snapshot information, it is determined the second application system and the third application system have a common snapshot. According to example implementations of the present disclosure, if it is determined the second snapshot information does not match the third snapshot information, it is determined the second application system and the third application system have no common snapshot. By comparing snapshot information in the second application system 120 and the third application system 130 to see whether there are snapshots with the same version number, it can be determined whether two application systems have a common snapshot. If the second snapshot information and the third snapshot information do not have snapshots with the same version number (i.e. do not have a matched portion), it can be determined the two systems have no common snapshot.

Returning to FIG. 4, at block 440, data may be synchronized to the third application system 130 depending on whether the second application system 120 and the third application system 130 have a common snapshot. According to example implementations of the present disclosure, if it is determined the second application system 120 and the third application system 130 have at least one common snapshot, data is synchronized to the third application system 130 based on the at least one common snapshot.

Figure 5:
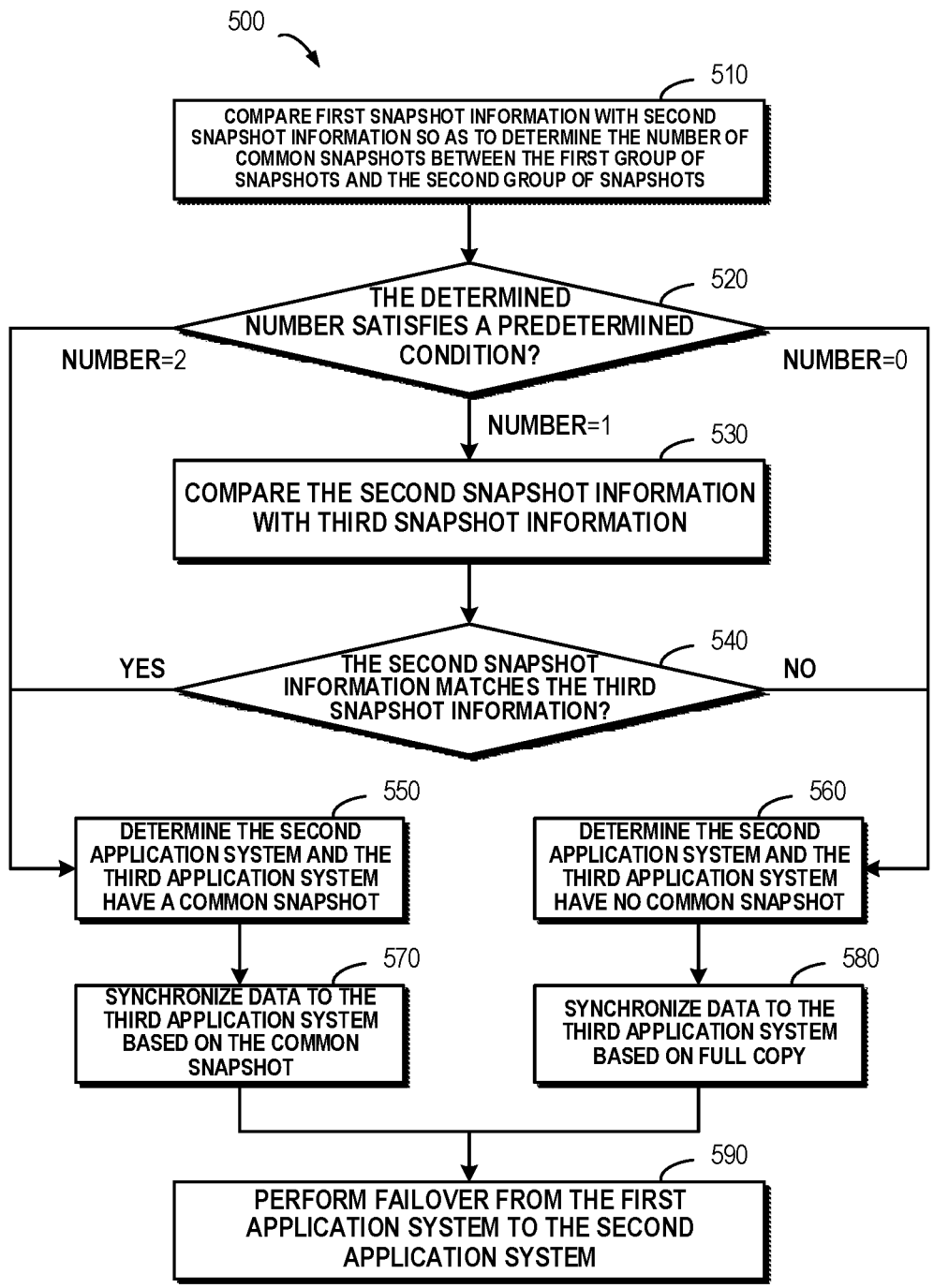
FIG. 5 schematically shows a flowchart of a method for managing application systems based on snapshot information of the application systems according to example implementations of the present disclosure.

More details about the method for managing application systems will be described with reference to FIG. 5. Specifically, this figure schematically shows a flowchart of a method 500 for managing application systems based on snapshot information of the application systems according to example implementations of the present disclosure. At block 510, the first snapshot information 312 and the second snapshot information 322 may be compared so as to determine the number of common snapshots between the first group of snapshots 310 and the second group of snapshots 320. For example, corresponding snapshot versions are obtained from snapshot information, and snapshot versions are compared so as to determine the number of common snapshots between the first group of snapshots 310 and the second group of snapshots 320. At block 520, different operations may be performed based on the determined number.

As shown by an arrow on the left of block 520, if it is determined the number of common snapshots between the first application system 110 and the second application system 120 is 2, then the method 500 proceeds to block 550, at which point it may be determined the second application system 120 and the third application system 130 have a common snapshot. As shown by an arrow below block 520, if it is determined the number of common snapshots between the first application system 110 and the second application system 120 is 1, then the method 500 proceeds to block 530.

At this point, the second snapshot information and the third snapshot information needs to be compared further.

At block 540, if the second snapshot information matches the third snapshot information (i.e. snapshot information includes snapshots with the same version number), then the method 500 proceeds to block 550 where it is determined the second application system 120 and the third application system 130 have a common snapshot. In case there is a common snapshot, at block 570 data is synchronized to the third application system 130 based on the common snapshot. At block 540, if the second snapshot information does not match the third snapshot information (i.e. snapshot information do not have snapshots with the same version number), then the method 500 proceeds to block 560 where it is determined the second application system 120 and the third application system 130 have no common snapshot. In case there is no common snapshot, at block 580 data may be synchronized to the third application system 130 based on full copy. Subsequently, where data has been synchronized based on the operation at block 570 or 580, the method 500 proceeds to block 590, at which point failover from the first application system 110 to the second application system 120 is performed.

Figure 6:
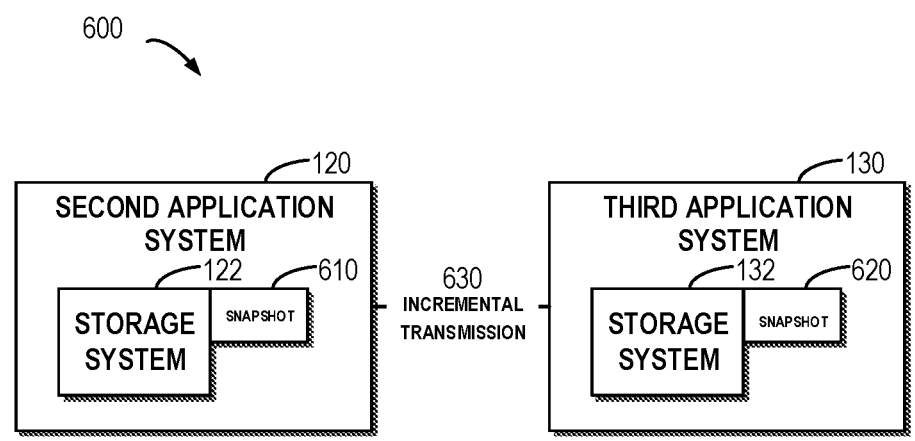
FIG. 6 schematically shows a block diagram of data synchronization between a second application system and a third application system based on incremental transmission according to example implementations of the present disclosure.

More details about synchronizing data based on a common snapshot will be described with reference to FIG. 6 below. This figure schematically shows a block diagram 600 of data synchronization between the second application system 120 and the third application system 130 based on incremental transmission according to example implementations of the present disclosure. As shown, suppose it is determined a snapshot 610 in the second application system 120 and a snapshot 620 in the third application system 130 are a common snapshot, then a difference portion between the second application system 120 and the latest version snapshot 610 may be determined so as to be synchronized to the third application system 130.

In this example implementation, an asynchronous replication connection may be built between the second application system 120 and the third application system 130, and data of the difference portion may be synchronized from the second application system 120 to the third application system 130 by way of incremental transmission 630. It will be understood due to the low requirement of asynchronous replication on network bandwidths, an asynchronous connection may be built between the second application system 120 and the third application system 130 based on an existing IP network.

It will be understood since there might exist two common snapshots, during synchronizing data to the third application system 130 based on the at least one common snapshot, the latest version snapshot of the at least one common snapshot may be determined first. The latest snapshot may be determined by querying version numbers in snapshot information. Then, data synchronization is performed based on the latest version snapshot, which may lower the bandwidth requirement during incremental transmission as far as possible.

Figure 7:
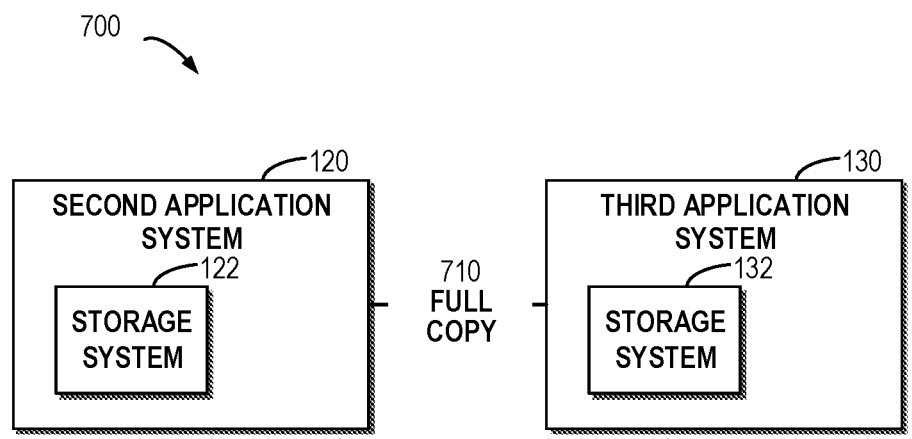
FIG. 7 schematically shows a block diagram of data synchronization between a second application system and a third application system based on full copy according to example implementations of the present disclosure.

According to example implementations of the present disclosure, if it is determined the second application system 120 and the third application system 130 have no common snapshot, then data synchronization to the third application system 130 should be based on full copy. More details about data synchronization based on full copy will be described with reference to FIG. 7 below. This figure schematically shows a block diagram 700 of data synchronization between the second application system 120 and the third application system 130 based on full copy according to example implementations of the present disclosure.

Since the second application system 120 and the third application system 130 have no common snapshot, all data in the storage system 122 needs to be copied to the third application system 130. At this point, an asynchronous replication connection may be built between the second application system 120 and the third application system 130, and data may be synchronized to the third application system 130 by way of full copy 710. Specifically, a snapshot of the storage system 122 may be generated at the second application system 120, and the snapshot may be transmitted to the third application system 130. After the third application system 130 receives the snapshot, the storage system 132 at the third application system 130 may be updated using the snapshot.

It will be understood the first application system 110, while running, might have a heavy workload, and further its speed of providing services to clients is decreased to some extent. At this point, planned failover from the first application system 110 to the second application system 120 may be performed in order to avoid further deterioration. Before performing the planned failover, the above described method 400 may be executed to determine how to perform data synchronization. An asynchronous replication connection may be built between the third application system 130 and the second application system 120 so as to provide a communication channel for data synchronization. After the failover, the second application system 120 turns to the active state.

According to example implementations of the present disclosure, the method 400 may be performed upon detecting the workload of the first application system 110 is higher than a predetermined threshold. It will be understood a high workload may be one of conditions for triggering planner failover. At this point, a service interface to the client 150 will not immediately switch from the first application system 110 to the second application system 120, but preparations for failover may be made first. The method 400 described with reference to FIG. 4 may be performed during preparation. In this way, first it may be determined whether the second application system 120 and the third application system 130 have a common snapshot, and further full copy between the second application system 120 and the third application system 130 might be avoided as far as possible.

After completing data synchronization, the third application system 130 has completed various preparations for failover, and thus the failover from the first application system 110 to the second application system 120 may be executed. During the failover, the service interface of the application environment to the outside will switch from the first application system 110 to the second application system 120, so that the second application system is in the active state. Specifically, FIG. 8 schematically shows a block diagram 800 of an application environment where failover is performed according to example implementations of the present disclosure.

Figure 8:
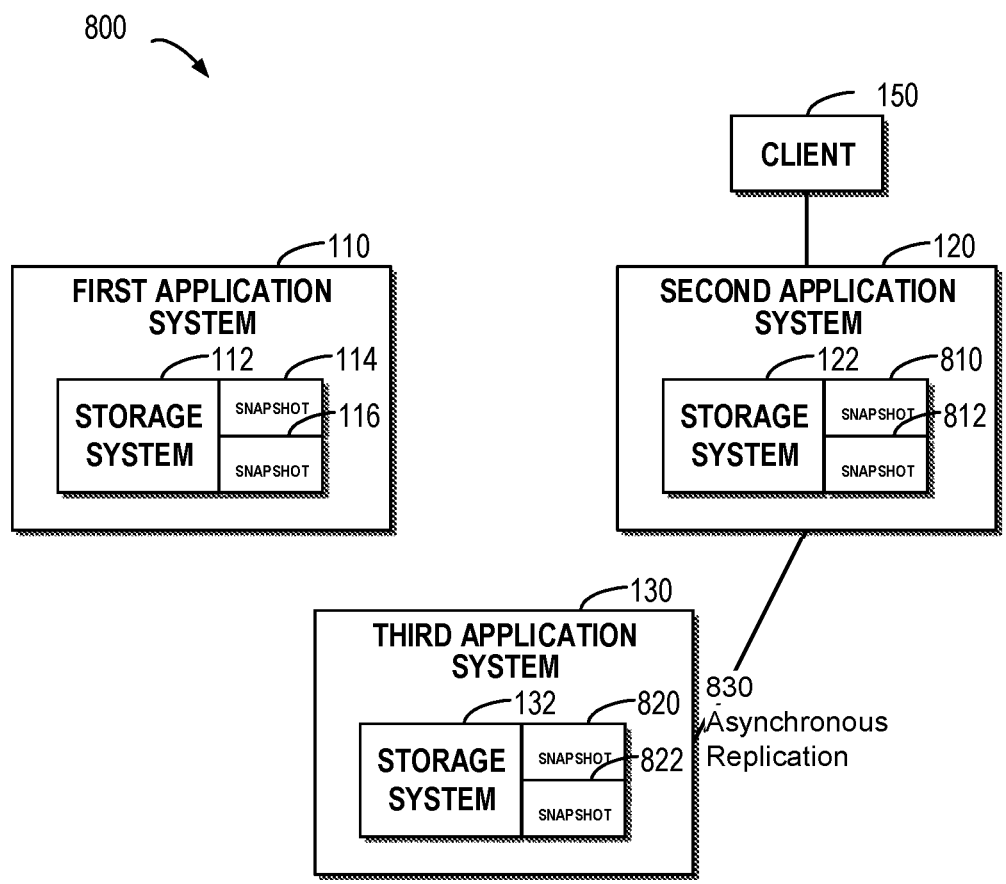
FIG. 8 schematically shows a block diagram of an application environment in which failover is performed according to example implementations of the present disclosure.

As shown in FIG. 8, before failover, the first application system 110 has the snapshots 114 and 116, the second application system 120 has snapshots 810 and 812, and the third application system 130 has snapshots 820 and 822. Suppose the snapshots 810 and 820 are a common snapshot, the snapshots 812 and 822 are a common snapshot, and the snapshots 812 and 822 are the latest version snapshot. At this point, an asynchronous replication 830 connection may be built between the second application system 120 and the third application system 130, and data is synchronized to the third application system 130 by way of incremental transmission. Subsequently, failover may be performed, the first application system 110 may be deactivated, and the second application system 120 may be activated. At this point, the client 150 will access data in the storage system 122 via the second application system 120.

With the above described example implementations, how to perform subsequent data synchronization may be judged using existing information at the first application system 110 as far as possible. On the one hand, it may be determined accurately whether the second application system 120 and the third application system 130 have a common snapshot, so as to avoid overheads arising from full copy. On the other hand, only when information at the first application system 110 is not enough to make judgment, extra data communication is needed, and further overheads for data transmission in the application environment may be reduced.

While examples of the method according to the present disclosure have been described in detail with reference to FIGS. 2 to 8, description is presented below to the implementation of a corresponding apparatus. According to example implementations of the present disclosure, provided is an apparatus for managing application systems in an application environment. The application environment includes a first application system, a second application system and a third application system. The apparatus includes: a first obtaining module configured to obtain first snapshot information of a first group of snapshots of the first application system, the first application system being in active state; a second obtaining module configured to obtain second snapshot information of a second group of snapshots of the second application system, the second application system being in standby state; a determining module configured to, based on the first snapshot information and the second snapshot information, determine whether the second application system and the third application system have a common snapshot; and a synchronizing module configured to synchronize data to the third application system depending on whether the second application system and the third application system have a common snapshot.

According to example implementations of the present disclosure, the determining module is further configured to, in response to determining the first snapshot information does not match the second snapshot information, determine the second application system and the third application system have no common snapshot.

According to example implementations of the present disclosure, the determining module further includes: a number determining module configured to determine the number of common snapshots between the first group of snapshots and the second group of snapshots based on the first snapshot information and the second snapshot information; and a common snapshot determining module configured to, in response to determining the number is 2, determine the second application system and the third application system have at least one common snapshot.

According to example implementations of the present disclosure, the determining module further includes: a number determining module configured to determine the number of common snapshots between the first group of snapshots and the second group of snapshots based on the first snapshot information and the second snapshot information; a common snapshot determining module configured to, in response to determining the number is 1, obtain third snapshot information of a third group of snapshots of the third application system; and based on the second snapshot information and the third snapshot information, determine whether the second application system and the third application system have a common snapshot.

According to example implementations of the present disclosure, the common snapshot determining module further includes at least one of: a first determining module configured to, in response to determining at least one part of the second snapshot information matches at least one part of the third snapshot information, determine the second application system and the third application system have a common snapshot; and a second determining module configured to, in response to determining the second snapshot information does not match the third snapshot information, determine the second application system and the third application system have no common snapshot.

According to example implementations of the present disclosure, the synchronizing module further includes: an incremental transmission module configured to, in response to determining the second application system and the third application system have at least one common snapshot, synchronize data to the third application system based on the at least one common snapshot.

According to example implementations of the present disclosure, the incremental transmission further includes: a version determining module configured to determine the latest version snapshot of the at least one common snapshot; a difference determining module configured to determine a difference portion between the a storage system in the second application system and the latest version snapshot; and a transmission module configured to synchronize the difference portion to the third application system.

According to example implementations of the present disclosure, the synchronizing module includes a copy module configured to, in response to determining the second applications system and the third application system have no common snapshot, synchronize data to the third application system based on full copy.

According to example implementations of the present disclosure, there is further comprised a detecting module configured to, in response to detecting a workload of the first application system is higher than a predetermined threshold, start the first obtaining module.

According to example implementations of the present disclosure, there is further comprised a failover module configured to perform failover from the first application system to the second application system so that the second application system is in active state.

Figure 9:
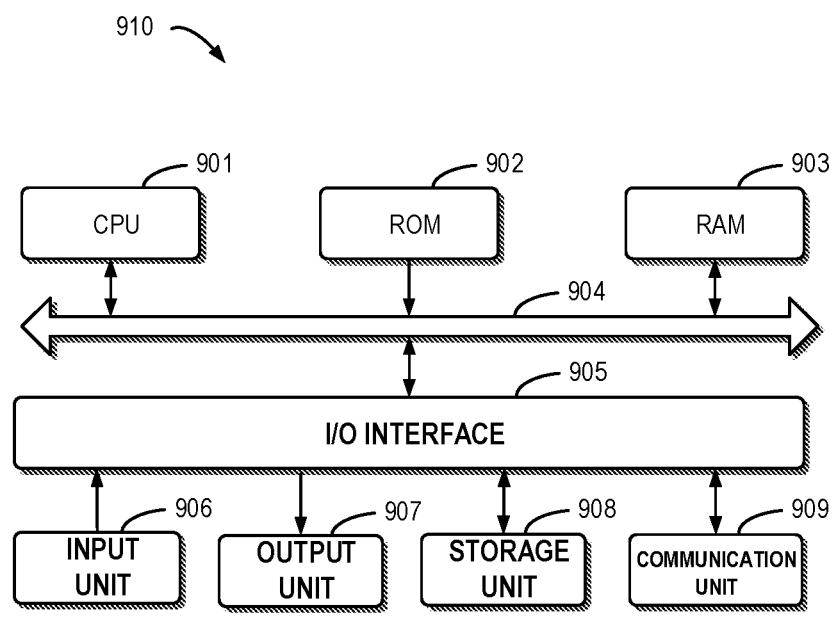
FIG. 9 schematically shows a block diagram of a device for managing application systems in an application environment according to example implementations of the present disclosure.

FIG. 9 schematically shows a block diagram of a device 900 for managing application systems according to example implementations of the present disclosure. As shown, the device 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the device 900 to exchange information/data with other devices via the computer network, such as Internet, and/or various telecommunication networks.

The above described each process and treatment, such as the methods 400 and 500 can also be executed by the processing unit 901. For example, in some implementations, the methods 400 and 500 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described methods 400 and 500 can be implemented. Alternatively, in other implementations, the CPU 901 also can be configured in other suitable manners to realize the above procedure/method.

According to example implementations of the present disclosure, there is provided a device for managing application systems in an application environment, the application environment including a first application system, a second application system and a third application system. The device includes: at least one processor; a volatile memory; and a memory coupled to the at least one processor, the memory having instructions stored thereon, the instructions, when executed by the at least one processor, causing the device to perform acts. The acts include: obtaining first snapshot information of a first group of snapshots of the first application system, the first application system being in active state; obtaining second snapshot information of a second group of snapshots of the second application system, the second application system being in standby state; based on the first snapshot information and the second snapshot information, determining whether the second application system and the third application system have a common snapshot; and synchronizing data to the third application system depending on whether the second application system and the third application system have a common snapshot.

According to example implementations of the present disclosure, determining based on the first snapshot information and the second snapshot information whether the second application system and the third application system have the common snapshot includes: in response to determining the first snapshot information does not match the second snapshot information, determining the second application system and the third application system have no common snapshot.

According to example implementations of the present disclosure, determining based on the first snapshot information and the second snapshot information whether the second application system and the third application system have the common snapshot includes: determining the number of common snapshots between the first group of snapshots and the second group of snapshots based on the first snapshot information and the second snapshot information; and in response to determining the number is 2, determining the second application system and the third application system have at least one common snapshot.

According to example implementations of the present disclosure, determining based on the first snapshot information and the second snapshot information whether the second application system and the third application system have the common snapshot includes: determining the number of common snapshots between the first group of snapshots and the second group of snapshots based on the first snapshot information and the second snapshot information; in response to determining the number is 1, obtaining third snapshot information of a third group of snapshots of the third application system; and based on the second snapshot information and the third snapshot information, determining whether the second application system and the third application system have a common snapshot.

According to example implementations of the present disclosure, determining based on the first snapshot information and the second snapshot information whether the second application system and the third application system have the common snapshot includes at least one of: in response to determining at least one part of the second snapshot information matches at least one part of the third snapshot information, determining the second application system and the third application system have the common snapshot; and in response to determining the second snapshot information does not match the third snapshot information, determining the second application system and the third application system have no common snapshot.

According to example implementations of the present disclosure, synchronizing data to the third application system depending on whether the second application system and the third application system have the common snapshot includes: in response to determining the second application system and the third application system have at least one common snapshot, synchronizing data to the third application system based on the at least one common snapshot.

According to example implementations of the present disclosure, synchronizing data to the third application system based on the at least one common snapshot includes: determining the latest version snapshot of the at least one common snapshot; determining a difference portion between the a storage system in the second application system and the latest version snapshot; and synchronizing the difference portion to the third application system.

According to example implementations of the present disclosure, synchronizing data to the third application system depending on whether the second application system and the third application system have a common snapshot includes: in response to determining the second applications system and the third application system have no common snapshot, synchronizing data to the third application system based on full copy.

According to example implementations of the present disclosure, the acts further include: performing acts in response to detecting a workload of the first application system is higher than a predetermined threshold.

According to example implementations of the present disclosure, the acts further include: performing failover from the first application system to the second application system so that the second application system is in active state.

According to example implementations of the present disclosure, there is provided a computer program product. The computer program product is tangibly stored on a non-transient computer readable medium and includes machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing application systems in an application environment, the application environment comprising a first application system, a second application system that takes over work of the first application system when the first application system is over-loaded, and a third application system that operates as a backup system, the method comprising:
performing synchronous replication from the first application system to the second application system;
performing asynchronous replication from the first application system to the third application system;
obtaining first snapshot information about a first group of snapshots of the first application system, including version information of snapshots in the first group of snapshots of the first application system, wherein the first group of snapshots of the first application system comprises at least two snapshots stored in the first application system and previously transmitted from the first application system to the third application system, the first application system being in active state;
obtaining second snapshot information about a second group of snapshots of the second application system, including version information of snapshots in the second group of snapshots of the second application system, wherein the second group of snapshots of the second application system comprises at least two snapshots stored in the second application system, the second application system being in standby state;
determining whether the second application system and the third application system have at least one common snapshot at least in part by comparing the first snapshot information and the second snapshot information, wherein the second application system and the third application system are determined to have at least one common snapshot in response to a determination that the first application system and the second application system have at least one common snapshot; and
synchronizing data to the third application system depending on whether the second application system and the third application system have at least one common snapshot.

2. The method of claim 1, wherein determining whether the second application system and the third application system have the common snapshot further comprises:
in response to determining the first snapshot information does not match the second snapshot information, determining the second application system and the third application system have no common snapshot.

3. The method of claim 1, wherein determining whether the second application system and the third application system have the common snapshot further comprises:
determining the number of common snapshots between the first group of snapshots and the second group of snapshots based on the first snapshot information and the second snapshot information; and
in response to determining the number is 2, determining the second application system and the third application system have at least one common snapshot.

4. The method of claim 1, wherein determining whether the second application system and the third application system have the common snapshot further comprises:
determining the number of common snapshots between the first group of snapshots and the second group of snapshots based on the first snapshot information and the second snapshot information;
in response to determining the number is 1,
obtaining third snapshot information of a third group of snapshots of the third application system, including version information of snapshots in the third group of snapshots of the third application system; and
determining whether the second application system and the third application system have a common snapshot at least in part by comparing the second snapshot information and the third snapshot information.

5. The method of claim 4, wherein determining whether the second application system and the third application system have the common snapshot further comprises at least one of:
in response to determining at least one part of the second snapshot information matches at least one part of the third snapshot information, determining the second application system and the third application system have a common snapshot; and
in response to determining the second snapshot information does not match the third snapshot information, determining the second application system and the third application system have no common snapshot.

6. The method of claim 1, wherein synchronizing the data to the third application system depending on whether the second application system and the third application system have the common snapshot comprises:
in response to determining the second application system and the third application system have at least one common snapshot, synchronizing data to the third application system based on the at least one common snapshot.

7. The method of claim 6, wherein synchronizing the data to the third application system based on the at least one common snapshot comprises:
determining a latest version snapshot of the at least one common snapshot;
determining a difference portion between a storage system in the second application system and the latest version snapshot; and
synchronizing the difference portion to the third application system.

8. The method of claim 1, wherein synchronizing the data to the third application system depending on whether the second application system and the third application system have the common snapshot comprises:
in response to determining the second applications system and the third application system have no common snapshot, synchronizing the data to the third application system based on full copy.

9. The method of claim 1, further comprising: performing the method in response to detecting a workload of the first application system is higher than a predetermined threshold.

10. The method of claim 9, further comprising:
performing failover from the first application system to the second application system so that the second application system is in active state.

11. The method of claim 1, wherein the synchronous replication from the first application system to the second application system is performed over a synchronous replication connection between the first application system and the second application system;
wherein the asynchronous replication from the first application system to the third application system is performed over an asynchronous replication connection between the first application system and the third application system; and wherein the method further comprises:
transmitting the first group of snapshots of the first application system from the first application system to the third application system through the asynchronous replication connection between the first application system and the third application system prior to both i) obtaining the first snapshot information about the first group of snapshots of the first application system, and ii) obtaining the second snapshot information about the second group of snapshots of the second application system.

12. The method of claim 11, wherein the work of the first application system includes serving at least one request from a client to access data.

13. The method of claim 12, wherein the second application system is further configured to take over the work of the first application system when the first application system fails.

14. A device for managing application systems in an application environment, the application environment comprising a first application system, a second application system that takes over work of the first application system when the first application system is over-loaded, and a third application system that operates as a backup system, the device comprising:
at least one processor;
a volatile memory; and
a memory coupled to the at least one processor and having instructions stored thereon, the instructions, when executed by the at least one processor, causing the device to perform acts comprising:
performing synchronous replication from the first application system to the second application system;
performing asynchronous replication from the first application system to the third application system;
obtaining first snapshot information about a first group of snapshots of the first application system, including version information of snapshots in the first group of snapshots of the first application system, wherein the first group of snapshots of the first application system comprises at least two snapshots stored in the first application system and previously transmitted from the first application system to the third application system, the first application system being in active state;
obtaining second snapshot information about a second group of snapshots of the second application system, including version information of snapshots in the second group of snapshots of the second application system, wherein the second group of snapshots of the second application system comprises at least two snapshots stored in the second application system, the second application system being in standby state;
determining whether the second application system and the third application system have at least one common snapshot at least in part by comparing the first snapshot information and the second snapshot information, wherein the second application system and the third application system are determined to have at least one common snapshot in response to a determination that the first application system and the second application system have at least one common snapshot; and
synchronizing data to the third application system depending on whether the second application system and the third application system have at least one common snapshot.

15. The device of claim 14, wherein determining whether the second application system and the third application system have the common snapshot further comprises:
in response to determining the first snapshot information does not match the second snapshot information, determining the second application system and the third application system have no common snapshot.

16. The device of claim 14, wherein determining whether the second application system and the third application system have the common snapshot further comprises:
determining the number of common snapshots between the first group of snapshots and the second group of snapshots based on the first snapshot information and the second snapshot information; and
in response to determining the number is 2, determining the second application system and the third application system have at least one common snapshot.

17. The device of claim 14, wherein determining whether the second application system and the third application system have the common snapshot further comprises:
determining the number of common snapshots between the first group of snapshots and the second group of snapshots based on the first snapshot information and the second snapshot information;
in response to determining the number is 1,
obtaining third snapshot information of a third group of snapshots of the third application system, including version information of snapshots in the third group of snapshots of the third application system; and
determining whether the second application system and the third application system have a common snapshot at least in part by comparing the second snapshot information and the third snapshot information.

18. The device of claim 17, wherein determining whether the second application system and the third application system have the common snapshot further comprises at least one of:
in response to determining at least one part of the second snapshot information matches at least one part of the third snapshot information, determining the second application system and the third application system have a common snapshot; and
in response to determining the second snapshot information does not match the third snapshot information, determining the second application system and the third application system have no common snapshot.

19. The device of claim 14, wherein synchronizing the data to the third application system depending on whether the second application system and the third application system have the common snapshot comprises:
in response to determining the second application system and the third application system have at least one common snapshot, synchronizing data to the third application system based on the at least one common snapshot.

20. The device of claim 19, wherein synchronizing the data to the third application system based on the at least one common snapshot comprises:
determining a latest version snapshot of the at least one common snapshot;
determining a difference portion between a storage system in the second application system and the latest version snapshot; and
synchronizing the difference portion to the third application system.

21. The device of claim 14, wherein synchronizing the data to the third application system depending on whether the second application system and the third application system have a common snapshot comprises:
in response to determining the second applications system and the third application system have no common snapshot, synchronizing data to the third application system based on full copy.

22. The device of claim 14, wherein the acts further comprise: performing the acts in response to detecting a workload of the first application system is higher than a predetermined threshold.

23. A computer program product having a non-transitory computer readable medium which stores a set of instructions to manage application systems in an application environment which includes a first application system, a second application system that takes over work of the first application system when the first application system is over-loaded, and a third application system that operates as a backup system; the set of instructions, when carried out by computerized circuitry, causing the computerized circuitry to perform a method of:

performing synchronous replication from the first application system to the second application system;

performing asynchronous replication from the first application system to the third application system;

obtaining first snapshot information about a first group of snapshots of the first application system, including version information of snapshots in the first group of snapshots of the first application system, wherein the first group of snapshots of the first application system comprises at least two snapshots stored in the first application system and previously transmitted from the first application system to the third application system, the first application system being in active state;

obtaining second snapshot information about a second group of snapshots of the second application system, including version information of snapshots in the second group of snapshots of the second application system, wherein the second group of snapshots of the second application system comprises at least two snapshots stored in the second application system, the second application system being in standby state;

determining whether the second application system and the third application system have at least one common snapshot at least in part by comparing the first snapshot information and the second snapshot information, wherein the second application system and the third application system are determined to have at least one common snapshot in response to a determination that the first application system and the second application system have at least one common snapshot; and synchronizing data to the third application system depending on whether the second application system and the third application system have at least one common snapshot.

* * * * *